(12) United States Patent
Planeta (10) Patent No.: US 8,691,132 B2
(45) Date of Patent: Apr. 8, 2014

(54) HEAT TREATMENT OF THIN POLYMER FILMS

(75) Inventor: Miroslav Planeta, Mississauga (CA)

(73) Assignee: Macro Engineering & Technology, Inc. (CA)

( * ) Notice: Subject to any disclaimer, the term of this patent is extended or adjusted under 35 U.S.C. 154(b) by 810 days.

(21) Appl. No.: 12/543,403

(22) Filed: Aug. 18, 2009

(65) Prior Publication Data

US 2010/0040837 A1    Feb. 18, 2010

Related U.S. Application Data

(60) Provisional application No. 61/089,831, filed on Aug. 18, 2008.

(51) Int. Cl.
*B29C 59/18* (2006.01)

(52) U.S. Cl.
USPC ........ 264/235.6; 264/232; 264/234; 264/235; 264/237; 264/345; 264/346; 264/348; 264/235.8; 264/327; 264/289.6; 264/264; 264/342 R (58) Field of Classification Search
USPC .............. 264/132, 232, 234, 235, 237, 288.4, 264/345, 346, 348, 509, 235.6, 235.8, 327, 264/289.6, 342 R
See application file for complete search history.

(56) References Cited

U.S. PATENT DOCUMENTS

| 3,423,274 | A |   | 1/1969 | Lahm et al. |
| 3,501,363 | A |   | 3/1970 | Kirkpatrick |
| 3,885,015 | A | * | 5/1975 | Ono et al. ................ 264/230 |
| 4,087,505 | A | * | 5/1978 | Sugimoto et al. ........ 264/564 |
| 4,436,788 | A | * | 3/1984 | Cooper .................... 428/483 |
| 5,182,069 | A | * | 1/1993 | Wick ...................... 264/210.2 |
| 5,221,058 | A | * | 6/1993 | Fillis ...................... 242/534.1 |
| 2007/0120278 | A1 | * | 5/2007 | Sugitani .................... 264/1.6 |

OTHER PUBLICATIONS

Zeus Industrial Products, Crystallinity in Plastics, Zeus Technical Newsletter, 2007, pp. 1-9.*

* cited by examiner

*Primary Examiner* — Timothy Kennedy
(74) *Attorney, Agent, or Firm* — Steven M. Greenberg; CRGO Law (57) ABSTRACT

Stretch film is treated by passing a web of tackifier-containing, unbloomed thin polymer film through a heater so that the web is heated to a temperature sufficient to cause tackifier bloom prior to the web reaching a next stage in an in-line process. Also, a pattern can be applied to a thin polymer film. An oriented web of thin polymer film is passed across at least one heated roller having the pattern engraved thereon to define face regions and relief regions collectively conforming to the pattern. As the web contacts each roller surface, portions of the web positioned over the relief regions receive less heat than portions of the web positioned over the face regions, thereby causing the respective portions of the web to undergo differential, heat-induced shrinkage which imparts the pattern to the thin polymer film.

7 Claims, 8 Drawing Sheets

HEAT TREATMENT OF THIN POLYMER FILMS

CROSS-REFERENCE TO RELATED APPLICATION

This application claims priority to U.S. Provisional Application No. 61/089,831 filed on Aug. 18, 2008, the teachings of which are hereby incorporated by reference.

FIELD OF INVENTION

The present invention relates to thin polymer films, and more particularly to heat treatment of thin polymer films.

BACKGROUND OF THE INVENTION

Stretch film is made by producing a thin polymer film by extrusion; the film so produced can then be stretched in order to modify its mechanical properties. Such films can be given "cling" properties by adding a tackifier to the polymer from which the stretch film is produced. In some cases, the tackifier-containing films are stretched before being wound onto a roll, and in other cases the films are wound onto the roll without any stretching, and the stretching is carried out when the film is being unwound and wrapped around its load (such as several boxes stacked on a pallet).

A significant problem associated with the traditional manufacture of stretch film having cling properties achieved by the addition of tackifier is that it has generally been considered necessary to "age" the thin polymer film, prior to stretching (whether by pre-stretching before rolling or during wrapping), in a temperature-controlled environment to allow the tackifier to "bloom", that is, come to the surface of the thin polymer film. It has been believed that if the film is stretched prior to the tackifier blooming to the surface, for example where a web of the thin polymer film were passed to a stretching mechanism shortly after production, the cling properties of the film are usually lost.

SUMMARY OF THE INVENTION

According to an aspect of the present invention, the time and cost of aging the thin polymer film until the tackifier blooms can be eliminated by actively causing the tackifier to bloom to the surface, preferably shortly after production of the thin polymer film. In particular, by applying an appropriate amount of heat to the tackifier-containing, unbloomed thin polymer film, the tackifier-containing, unbloomed thin polymer film can be made to bloom rapidly. The thin polymer film may be, without limitation, a monolayer film, a co-extruded multilayer film, a multilayer film comprising a plurality of individual film layers, or an extrusion coating laminate.

In one aspect, the present invention is directed to a method for treating thin polymer film. The method comprises heating a web of tackifier-containing, unbloomed thin polymer film to a temperature sufficient to cause tackifier bloom prior to the web reaching a next step in an in-line process, so that the web of tackifier-containing, unbloomed thin polymer film becomes a web of tackifier-containing, bloomed thin polymer film prior to the web reaching a next step in an in-line process. The thin polymer film can be heated before being stretched, after being stretched, or in a process that omits any stretching (other than stretching inherent in the production of the thin polymer film). Thus, the next step in the process, after heating the tackifier-containing, unbloomed thin polymer film to induce blooming, may be a stretching step, or may be a winding step.

In one embodiment, the web is heated by being passed through a heater. The heater may comprise at least one heated roller, an infrared heater assembly, or an electrical resistance element oven assembly.

Optionally, the method may comprise an earlier step of first producing the web of tackifier-containing, unbloomed thin polymer film. In such an embodiment, the web of tackifier-containing, unbloomed thin polymer film may be produced, for example, by a blown film production process or by a cast film production process. In addition, the method may comprise an optional step of stretching the web of tackifier-containing, unbloomed thin polymer film (e.g. by passing the web through a stretching mechanism) prior to heating the web. The method may also comprise an optional step of stretching the web of tackifier-containing, bloomed thin polymer film (e.g. by passing the web through a stretching mechanism) after it has been heated and thus made to bloom. Also optionally, the web of tackifier-containing, unbloomed thin polymer film could be stretched, heated so as to cause tackifier bloom, and then stretched again.

In some embodiments, a web of tackifier-containing, stretched, unbloomed thin polymer film may be produced and then heated shortly after being produced (i.e. passed to the heater as a next step in an in-line process), omitting any step of passing the tackifier-containing, unbloomed thin polymer film through a stretching mechanism.

In another aspect, the present invention is directed to a method for applying a pattern to a thin polymer film. The method comprises passing an oriented web of the thin polymer film across a roller mechanism comprising at least one heated roller. The at least one heated roller has at least a portion of the pattern engraved on a surface thereof, so as to define face regions and relief regions on the surface, with the face regions and relief regions collectively conforming to the pattern. As the web contacts the surface of the at least one roller, portions of the web positioned over the relief regions receive relatively less heat from the at least one roller than portions of the web positioned over the face regions of the at least one roller, thereby causing the respective portions of the web to undergo differential, heat-induced shrinkage whereby the differential heat-induced shrinkage imparts the pattern to the thin polymer film. The pattern may be an arrangement of lines, a pattern of similar or dissimilar geometric shapes, or may comprise words, images or combinations thereof, such as a trademark, corporate name or corporate logo. In one embodiment, a heated roller may be configured with changeable type, and may be used to apply an expiry date onto thin polymer film which is to be used to wrap perishable items.

In a further aspect, the present invention is directed to a method for treating stretch film and applying a pattern thereto. The method comprises passing a web thin polymer film across at least one heated roller. The at least one heated roller has the pattern engraved on a surface thereof, so as to define face regions and relief regions on the surface, with the face regions and relief regions collectively conforming to the pattern. As the web contacts the surface of the at least one roller, portions of the web positioned over the relief regions receive relatively less heat from the at least one roller than portions of the web positioned over the face regions of the at least one roller, thereby causing the respective portions of the web to undergo differential, heat induced shrinkage whereby the differential heat-induced shrinkage imparts the pattern to the thin polymer film.

In one embodiment, the web contains tackifier, and the web is unbloomed when passed across a first one of the at least one heated roller, and the portions of the web positioned over the face regions of the at least one roller are heated to a temperature sufficient to cause tackifier bloom prior to the web reaching a winder.

The web of tackifier-containing, unbloomed thin polymer film can be passed across the at least one heated roller either before stretching, after stretching, between two stretching steps, or in a process that does not include any stretching.

In other aspects, the present invention is directed to apparatus for implementing the above-described methods, and to products produced by the above-described methods.

BRIEF DESCRIPTION OF THE DRAWINGS

These and other features of the invention will become more apparent from the following description in which reference is made to the appended drawings wherein.

DETAILED DESCRIPTION

Figure 1:
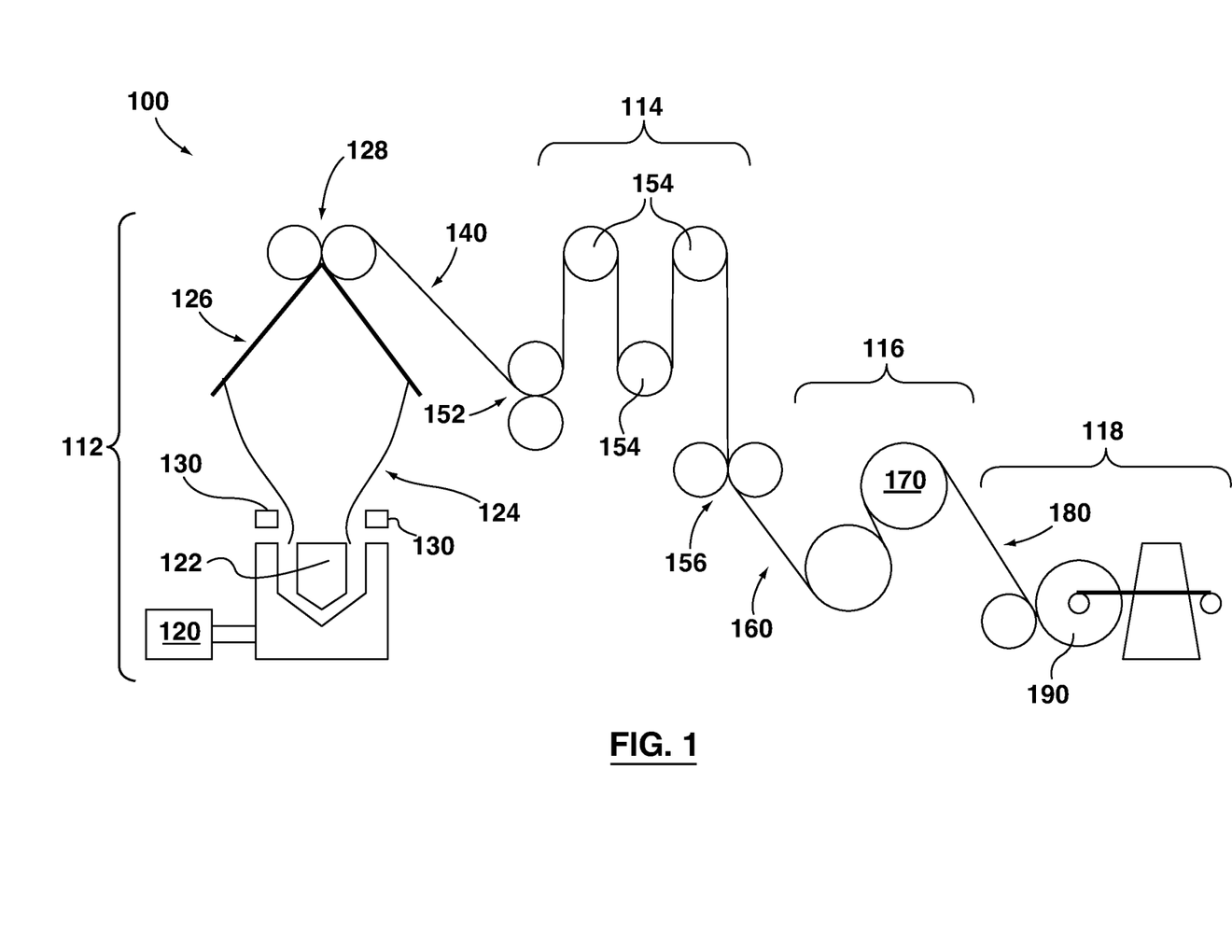
FIG. 1 is a schematic representation of a first apparatus for treating thin polymer film, in accordance with an aspect of the present invention.

Referring now to FIG. 1, an exemplary embodiment of an apparatus 100 comprises a film production unit 112, a stretching mechanism 114, a heater 116, and a winder 118 arranged in series. In the embodiment shown, the film production unit 112 is a blown film production unit as is known in the art, comprising an extruder 120 which feeds molten polymer to a die 122 so that a blown bubble 124 of thin polymer film emerges from the die 122. Cooling units 130 cool the blown bubble 124 via blown air technique, as is known in the art; alternatively (not shown) cooling units may be positioned downstream of the film production unit 112. Where, as in the embodiment shown in FIG. 1, the thin polymer film is extruded, it will be at least partially oriented as a result of the extrusion process; this is referred to as primary orientation.

The film production unit 112 further includes a collapsing frame 126 for collapsing the bubble 124 and a first set of pull rollers 128, so that in operation, a web 140 of tackifier-containing, unbloomed thin polymer film emerges from the film production unit 112 at the first set of pull rollers 128. The web 140 may be considered to be "unstretched", notwithstanding that some stretching may result from the process of producing the thin polymer film. Also, as used herein, the term "unbloomed" does not require that there be no blooming whatsoever, but rather refers to there being sufficiently little blooming that the relevant web has little or no cling properties resulting from the tackifier. Thus, a web which has experienced some negligible amount of blooming would still be considered "unbloomed" as that term is used herein.

Following production, the web 140 of tackifier-containing, unbloomed thin polymer film is stretched. More particularly, the web 140 is passed, by way of a second set of pull rollers 152, through the stretching mechanism 114 which, in the embodiment shown, comprises a set of stretch rollers 154. The stretching mechanism 114 carries out a stretching operation so that the web 140 of tackifier-containing, unbloomed, unstretched thin polymer film becomes a web 160 of unbloomed, stretched thin polymer film. This stretching operation results in either mono- or bi-axially oriented film (i.e. oriented in one or two directions). A third set of pull rollers 156 cooperates with the second set of pull rollers 128 to increase the speed of the web as it moves through the stretching mechanism 114 and thereby stretch the web; this third set of pull rollers 156 also maintains a constant speed of the web 160 of unbloomed, stretched thin polymer film as it exits the stretching mechanism 114 and is passed to the heater 116. In the particular embodiment shown, the heater 116 comprises a heated roller 170; a plurality of heated rollers, or other suitable heating arrangements, may also be used. The heater 116 is configured so that as the web passes through the heater, the web is heated to a temperature sufficient to cause tackifier bloom on the surface of the web prior to the web reaching the next stage in the in-line process depicted in FIG. 1, which in this case is the winder 118. Such temperature may be selected based on several factors, including the type of thin polymer film, the distance from the heater 116 to the winder 118, and the speed at which the web is moving. Typically, such a temperature will be significantly higher than ordinary room temperature. For example, the web 160 may be heated to a temperature approaching the Vicat softening point of the relevant polymer. Thus, the web 160 of unbloomed, stretched thin polymer film is converted, by application of heat from the heater 116, into a web 180 of bloomed, stretched thin polymer film, which, after exiting the heater 116, is passed to the winder 118 and wound into a roll 190.

Thus, a thin polymer film having tackifier-induced cling properties is produced by first producing a web 140 of tackifier-containing, unstretched, unbloomed thin polymer film, stretching the web 140 by passing the web 140 through a stretching mechanism (such as stretching mechanism 114) to produce a web 160 of tackifier-containing, unbloomed, stretched thin polymer film, and then heating the web 160 by passing the web 160 through a heater (such as heater 116) so that the web 160 is heated to a temperature sufficient to cause tackifier bloom prior to the web reaching a winder, thereby becoming a web 180 of tackifier-containing, bloomed, stretched thin polymer film by the time it reaches the winder (such as winder 118), where it is wound into a roll.

In accordance with another aspect of the present invention, a pattern can be applied to a thin polymer film. The thin polymer film may be, without limitation, a monolayer film, a co-extruded multilayer film, a multilayer film comprising a plurality of individual film layers, or an extrusion coating laminate. Moreover, the thin polymer film to which the pattern is to be applied may, but need not, contain tackifier. For example, stretched films having an outer layer made from a tacky polymer such as EVA or metallocene may be used.

Figure 2:
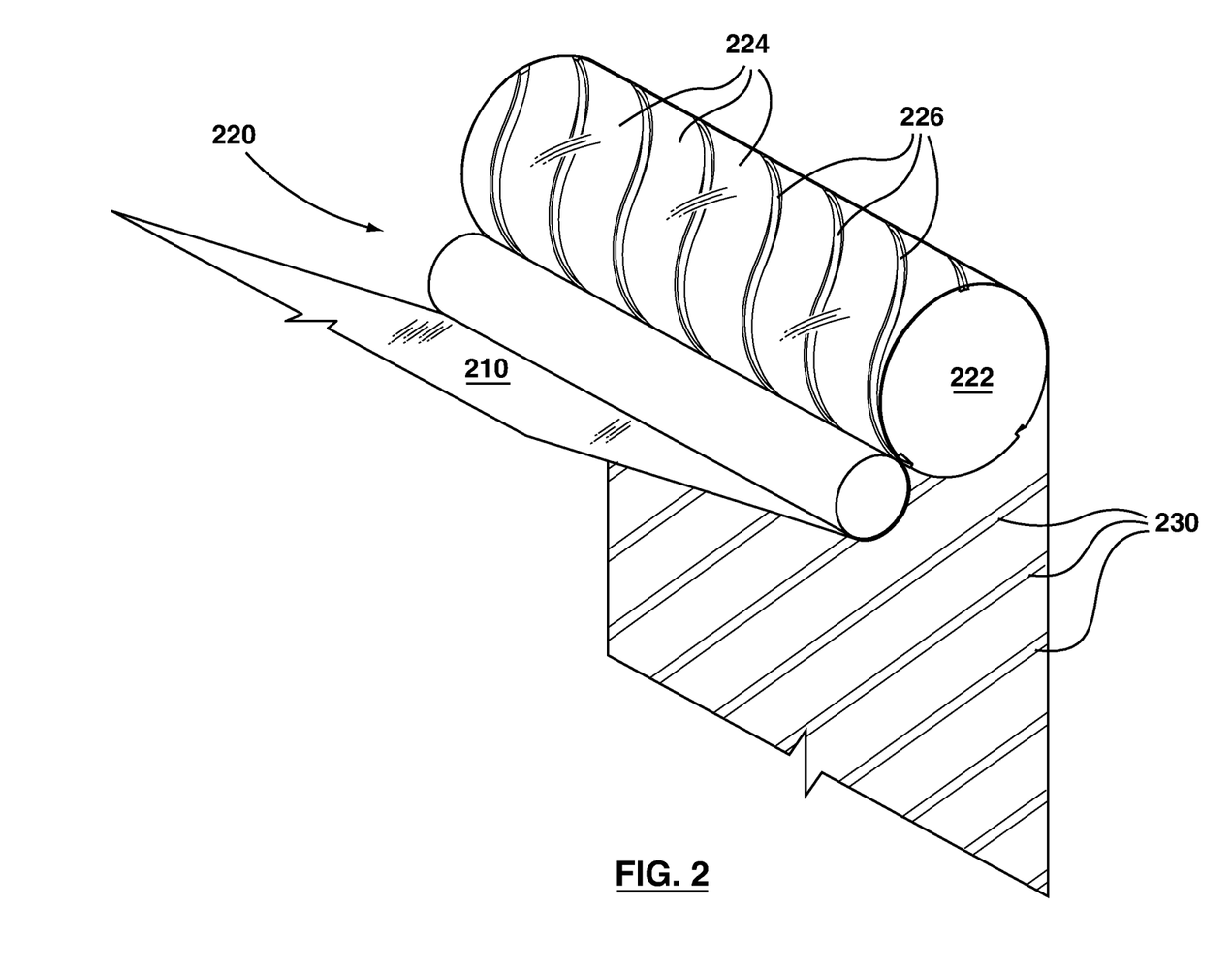
FIG. 2 is a perspective view of a portion of a first embodiment of an apparatus for applying a pattern to a thin polymer film, in accordance with an aspect of the present invention.
Figure 2A:
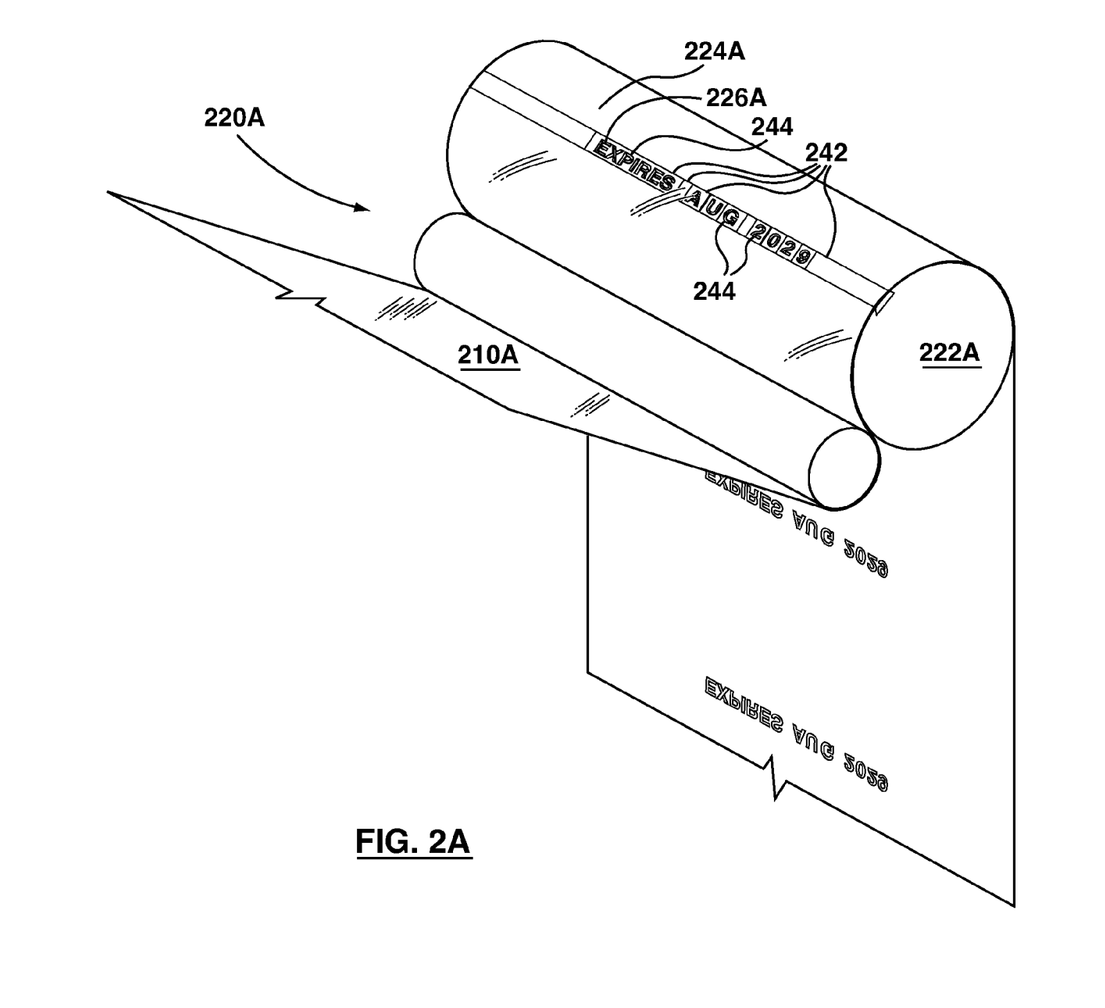
FIG. 2A is a perspective view of a portion of a second embodiment of an apparatus for applying a pattern to a thin polymer film, in accordance with an aspect of the present invention.

With reference now to FIG. 2, in a method according to an aspect of the present invention, an oriented web 210 of thin polymer film is passed across a roller mechanism comprising at least one heated roller 222 having at least a portion of a pattern engraved on its surface. The web 210 of thin polymer film may be mono-axially oriented or bi-axially oriented. The pattern may be, for example and without limitation, an arrangement of lines, as shown in FIG. 2, or may comprise a pattern of similar or dissimilar geometric shapes, or may comprise words, images or combinations thereof, such as a trademark, corporate name or corporate logo. In one embodiment, as shown in FIG. 2A, a heated roller may be configured with changeable type, and may be used to apply an expiry date onto thin polymer film which is to be used to wrap perishable items. In FIG. 2A, the components are generally identical to those in FIG. 2, except that the heated roller is somewhat different in its exterior construction. As such, identical reference numerals, with the suffix A appended thereto, are used to refer to corresponding components.

In the embodiment shown in FIG. 2, the entire pattern is engraved on the surface of the single roller 222; in other embodiments (not shown), a plurality of rollers may each have a portion of the pattern engraved on a surface thereof, so that the rollers can cooperate with one another to apply the entire pattern, for example where the pattern is larger than the surface area of a single roller. While the web 210 must be oriented before contacting the heated roller 222, orientation resulting from the extrusion process will generally be sufficient, and additional stretching operations carried out prior to the web 210 contacting the heated roller 222, although potentially advantageous, are generally not necessary to apply a pattern to thin polymer film in accordance with the exemplary method.

The pattern is engraved on the surface of the heated roller 222 so as to define at least one face region 224 and at least one relief region 226 on the surface of the roller, with the face region(s) 224 and relief 226 region(s) collectively conforming to the pattern. In the particular embodiment shown in FIG. 2, the pattern consists of a series of parallel lines, and the pattern has been engraved on the surface of the roller 222 in the form of a helix resulting from conforming the pattern to the curvature of the roller 222. Thus, the engraved helix becomes a single, continuous relief region 226, and the unengraved portion (a wider helix) becomes a single, continuous face region 224. The number, shape configuration and location of face regions and relief regions will of course be determined by the pattern. For example, as shown in FIG. 2A, the pattern on the roller 222A is formed by the engraved word "EXPIRES" together with individual pieces of movable type 242 having lettering 244 engraved thereon, to form an expiry date. As will be appreciated, the movable type permits the expiry date to be updated. The movable type 242 may be secured to the roller 222A by slidable mounting in a channel, or by magnetic attachment, or by other suitable techniques, as will apparent to one skilled in the art, now informed by the herein disclosure.

In addition, the engraving on the roller 222 is designed to prevent air from becoming trapped between the roller 222 and the web 210 of thin polymer film; if air does become entrapped between the 210 web and the roller 222, the web 210 may begin hydroplaning and at certain speeds may lose contact with the roller 222 and shift sideways.

As noted above, the roller 222 is heated; heating of the roller 222 may be by any suitable means. The temperature of the heated roller 222 is selected based on the type of polymer, together with the speed of travel of the web 210 of thin polymer film, to induce a desired amount of shrinkage in the relevant portions of the thin polymer film.

In operation, as the web 210 contacts the surface of the roller 222, those portions of the web 210 that are positioned over the relief region(s) 226 receive relatively less heat from the roller than those portions of the web 210 positioned over the face region(s) 224 of the roller 222. In particular, the portions of the web 210 that are positioned over the relief region(s) 226 will be partially insulated from the heat of the roller 222, while the portions of the web 210 positioned over the face region(s) 224 of the roller 222 will be in direct contact with the face region(s) 224 so as to receive heat directly from the surface of the roller 222. Because portions of the web that are positioned over the relief region(s) 226 receive relatively less heat from the roller 222 than those portions of the web 210 positioned over the face region(s) 224 of the roller 222, the respective portions of the web 210 undergo differential, heat-induced shrinkage, that is, the portions of the web 210 positioned over the face region(s) 224 of the roller will receive more heat and thereby shrink by a greater amount than will the portions of the web 210 that are positioned over the relief region(s) 226. It is this differential, heat-induced shrinkage that imparts the pattern to the thin polymer film, because the differential shrinkage causes the respective portions of the thin polymer film to have different surface textures. As a result, the pattern will appear in the form of matte portions contrasting with an otherwise somewhat reflective surface of the web 210 of thin polymer film. Thus, a series of parallel lines 230 (that is, the pattern) are visible on the part of the web 210 that has been exposed to the heated roller 222. It will be appreciated that the pattern may be engraved on the heated roller or rollers as either a positive image or a negative image, since the resulting thin polymer film will have a positive image of the pattern visible on one surface and a negative image of the pattern visible on the opposed surface.

Thus, a method and apparatus have been described for producing a thin polymer film having a pattern embodied therein, with the pattern resulting from differential, heat-induced shrinkage of respective portions of the thin polymer film. It will be appreciated that because heat-induced shrinkage affects the mechanical properties of the regions of thin polymer film that are shrunk, careful selection of patterns can be used to influence the mechanical properties of the resulting thin polymer film.

Figure 3:
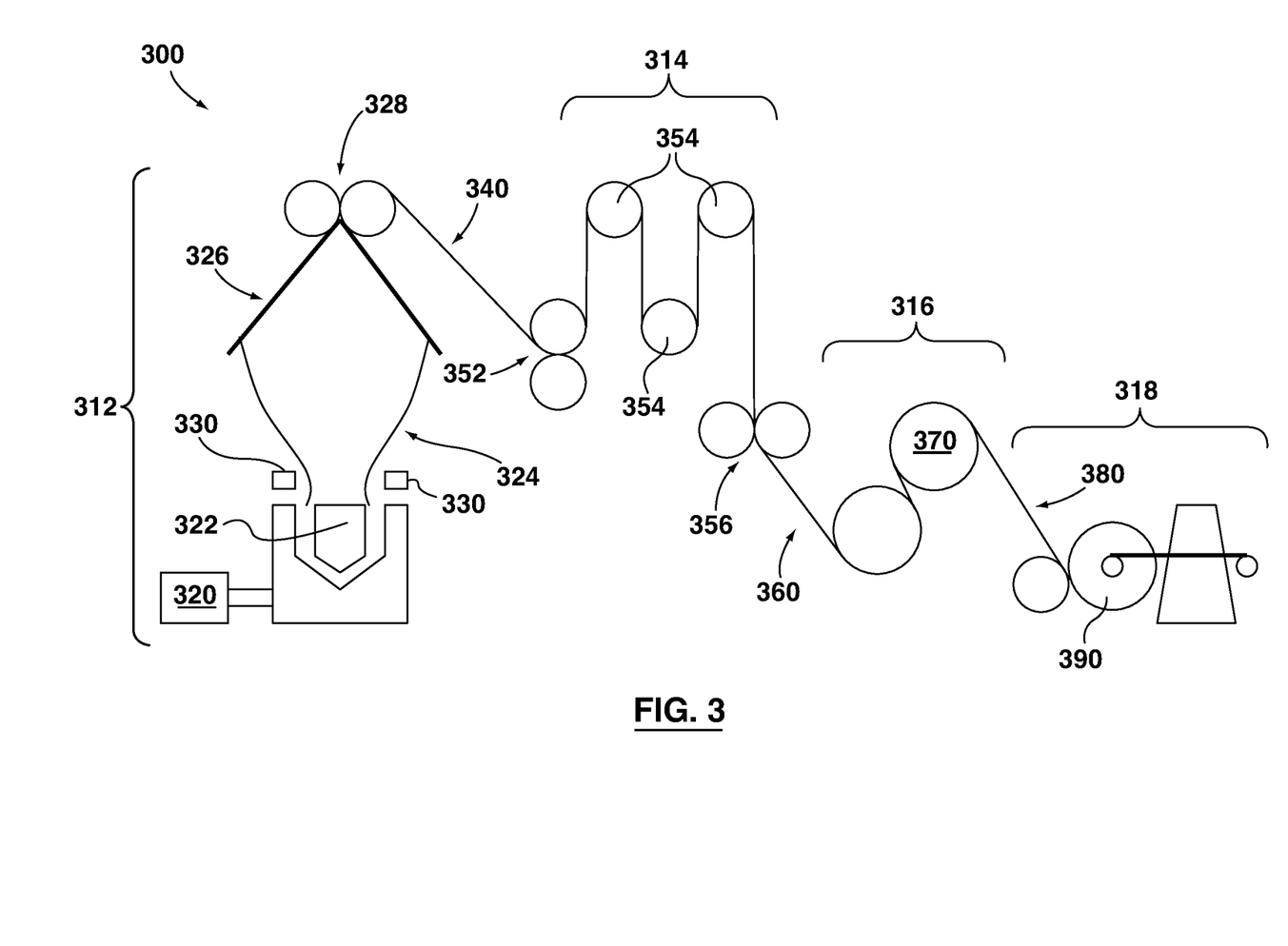
FIG. 3 is a schematic representation of a second apparatus for treating thin polymer and applying a pattern thereto, in accordance with an aspect of the present invention.

The above-described method for applying a pattern to a thin polymer film may be used with thin polymer films that do not contain tackifier, and may also be used with thin polymer films which contain tackifier. When used with thin polymer films that contain tackifier, the above-described method may be integrated with methods of producing stretch film having tackifier-induced cling properties. With reference now to FIG. 3, an apparatus including a film production unit, a stretching mechanism, a heater in the form of a heated roller and a winder is shown generally at 300. The apparatus shown in FIG. 3 is similar to the apparatus shown in FIG. 1, except that the heated roller 370 shown in FIG. 3 has a pattern engraved thereon. Thus, analogous reference numerals, beginning with "3" instead of "1" are used to denote parts of the apparatus 300 that correspond to similar parts of the apparatus 100 shown in FIG. 1. Accordingly, the film production apparatus 312 in FIG. 3 corresponds to the film production apparatus 112 in FIG. 1, the stretching mechanism 314 in FIG. 3 corresponds to the stretching mechanism 114 in FIG. 1, and so on.

In operation, a web 340 of unbloomed, unstretched thin polymer film is produced at the film production unit 312 and then passed to the stretching mechanism 314 where it undergoes a stretching operation so that it becomes a web 360 of unbloomed, stretched thin polymer film, which is then passed to the heater 316, in this case the heated roller 370 which has a pattern engraved thereon in the form of relief regions and face regions (not shown in FIG. 3). As the web 360 of unbloomed, stretched thin polymer film passes over the heated roller 370, the portions of the web positioned over the face regions of the heated roller 370 receive more heat and thereby shrink by a greater amount than the portions of the web that are positioned over the relief regions, so that the pattern is imparted to the thin polymer film as described above. In addition, the temperature of the heated roller 370 is selected so that, because the portions of the web that are positioned over the relief regions receive less heat than the portions of the web that are positioned over the face regions, only the portions of the web that are positioned over the face regions will bloom, while the portions of the web that are positioned over the relief regions remain unbloomed. Thus, by appropriately selecting the pattern engraved on the heated roller 370, it is possible to control which regions of the web of thin polymer film become tacky, so that the amount of cling in the finished stretch film can be tailored to the particular application in which the stretch film will be used.

When the web 380 of at least partially bloomed, stretched, thin polymer film emerges from the heater 316, it proceeds to the winder 318 where it is wound into a roll 390.

Thus, a thin polymer film having tackifier-induced cling properties, and having a pattern embodied therein resulting from differential, heat-induced shrinkage of respective portions of the thin polymer film, is produced by first producing a web 340 of tackifier-containing, unstretched, unbloomed thin polymer film, stretching the web 340 by passing the web 340 through a stretching mechanism (such as stretching mechanism 314) to produce a web 360 of tackifier-containing, unbloomed, stretched thin polymer film, and then heating the web 360 by passing the web 360 through a heater 316 comprising a heated roller 370 having a pattern engraved thereon so that the web 360 is heated to a temperature sufficient to cause tackifier bloom on at least some portions of the web and impart a pattern to the web by heat-induced, differential shrinkage, prior to the web reaching a winder (such as winder 318), where it is wound into a roll 390.

Figure 4:
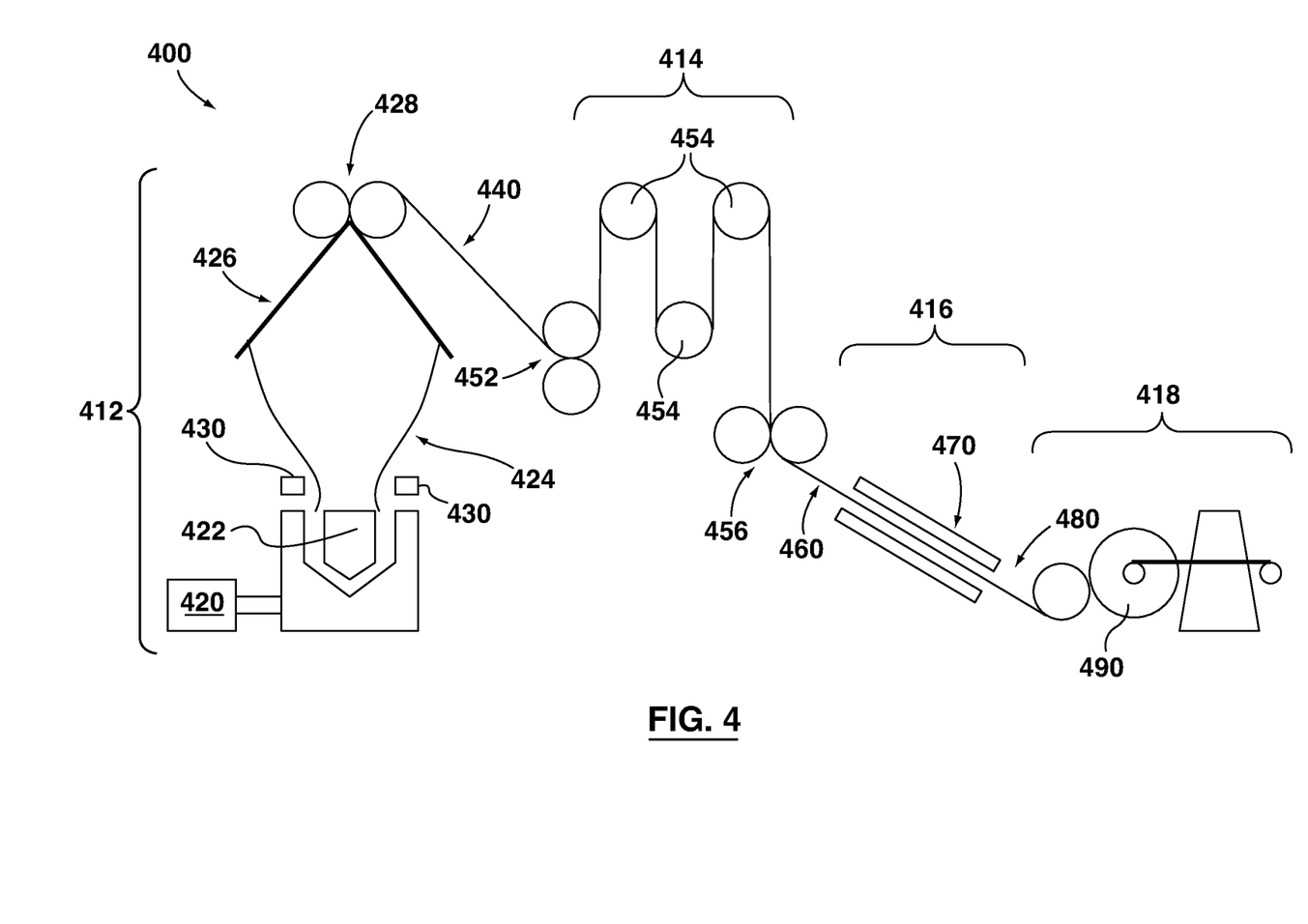
FIG. 4 is a schematic representation of a third apparatus for treating thin polymer film, in accordance with an aspect of the present invention.

With reference now to FIG. 4, an apparatus including a film production unit 412, a stretching mechanism 414, a heater 416 and a winder 418 is shown generally at 400. The apparatus 400 shown in FIG. 4 is generally identical to the apparatus shown in FIG. 1, except that instead of a heated roller, the heater comprises an oven assembly 470, which may be, for example, an infrared oven assembly or a conventional oven assembly using electrical resistance elements to produce heat. Analogous reference numerals, beginning with "4" instead of "1", are used to denote parts of the apparatus 400 that correspond to similar parts of the apparatus 100 shown in FIG. 1. Accordingly, the film production apparatus 412 in FIG. 4 corresponds to the film production apparatus 112 in FIG. 1, the stretching mechanism 414 in FIG. 4 corresponds to the stretching mechanism 114 in FIG. 1, and so on.

Thus, a thin polymer film having tackifier-induced cling properties is produced by first producing a web 440 of tackifier-containing, unstretched, unbloomed thin polymer film, stretching the web 440 by passing the web 440 through a stretching mechanism (such as stretching mechanism 414) to produce a web 460 of tackifier-containing, unbloomed, stretched thin polymer film, and then heating the web 460 by passing the web 460 through a heater 416, in this case oven assembly 470, so that the web 460 is heated to a temperature sufficient to cause tackifier bloom prior to the web reaching a winder (such as winder 418), thereby becoming a web 480 of tackifier-containing, bloomed, stretched thin polymer film by the time it reaches the winder 418, where it is wound into a roll 490.

It will also be appreciated that in some circumstances where thin polymer film is produced by an extrusion process, the thin polymer film may, as a result of the extrusion process itself, be sufficiently stretched and oriented for the application in which the thin polymer film is to be used. In other words, in such circumstances no additional stretching is necessary to impart the desired mechanical properties to the thin polymer film that emerges from the film production unit, such film, notwithstanding the inherent stretching, is considered "unstretched". Alternatively, where the thin polymer film is intended to be stretched only when it is being wound around a load, additional stretching during the production process is also not required. In these situations, no stretching mechanism need be included in the film production apparatus. Typically, where the thin polymer film is to be less than 10-20 microns in thickness, additional stretching is used to achieve the desired thickness, and where the thin polymer film is to be more than 10-20 microns in thickness, no additional stretching is done.

Figure 5:
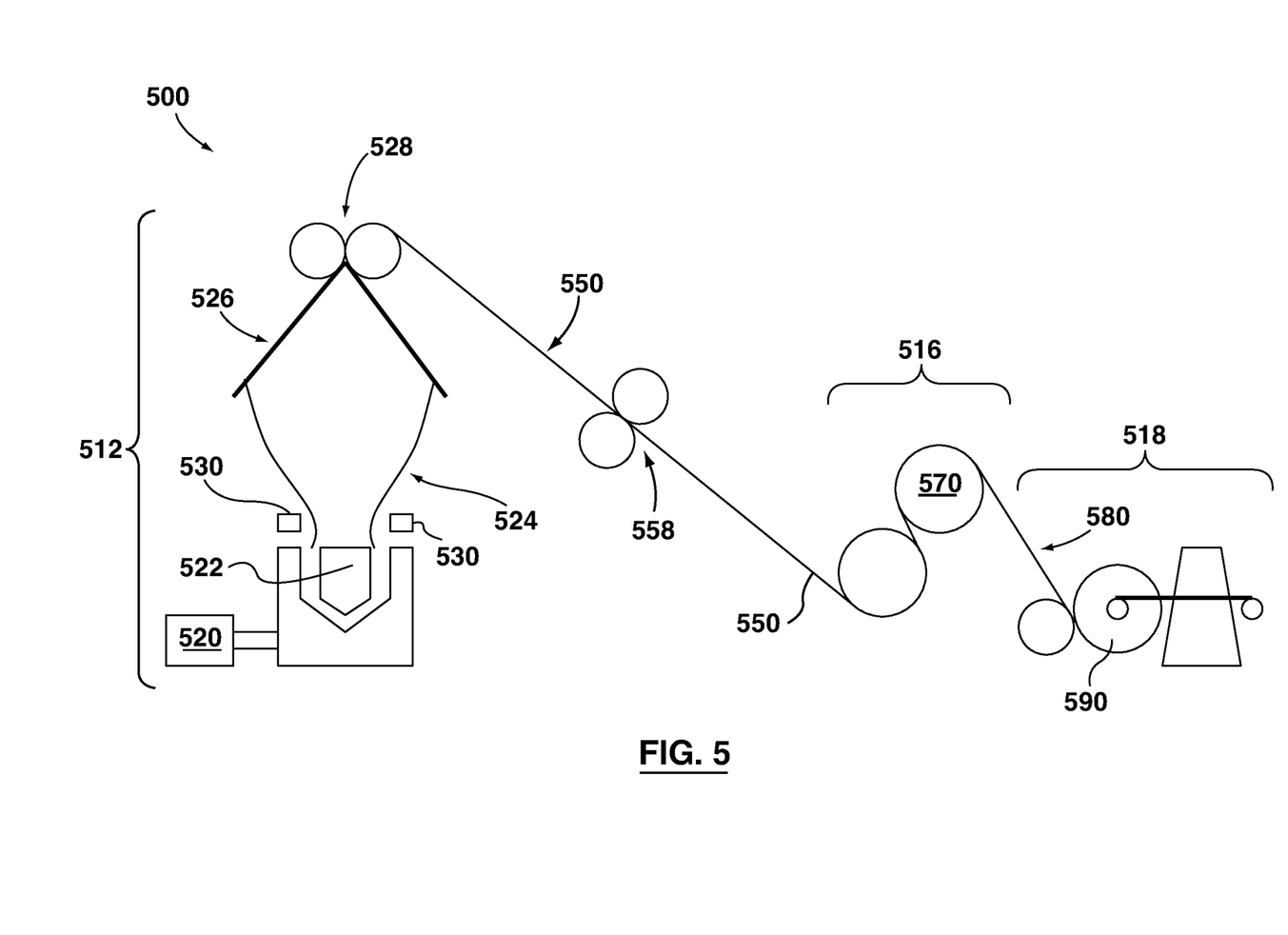
FIG. 5 is a schematic representation of a fourth apparatus for treating thin polymer film, in accordance with an aspect of the present invention.

With reference now to FIG. 5, an apparatus including a film production unit 512, a heater 516 and a winder 518 is shown generally at 500. The apparatus 500 shown in FIG. 5 is generally identical to the apparatus shown in FIG. 1, except for the following. The apparatus 500 does not contain any stretching mechanism analogous to the stretching mechanism 114, and second and third sets of pull rollers 152, 156 are correspondingly replaced by a single second set of pull rollers 558. Also, instead of a web 140 of tackifier-containing, unbloomed, unstretched thin polymer film emerging from the film production unit 112 to enter the stretching mechanism 114 to become a web 160 of tackifier-containing, unbloomed, stretched thin polymer film which proceeds to the heater 116, a web 550 of tackifier-containing, unbloomed, unstretched thin polymer film emerges at the first set of pull rollers 528 and passes by way of the second set of pull rollers 558 directly to the heater 516. Moreover, the heater 516 is shown as comprising a heated roller 570; the heated roller 570 may optionally have a pattern engraved thereon for applying a pattern to a thin polymer film. Aside from the above-noted differences, analogous reference numerals, beginning with "5" instead of "1", are generally used to denote parts of the apparatus 500 that correspond to similar parts of the apparatus 100 shown in FIG. 1. Accordingly, the film production apparatus 512 in FIG. 5 corresponds to the film production apparatus 112 in FIG. 1, the heater 516 in FIG. 5 corresponds to the heater 116 in FIG. 1, and so on.

Thus, a thin polymer film having tackifier-induced cling properties is produced by first producing a web 550 of tackifier-containing, unstretched, unbloomed thin polymer film, heating the web 550 by passing the web 550 through a heater 516, in this case a heated roller 570, so that the web 550 is heated to a temperature sufficient to cause tackifier bloom prior to the web reaching a winder 518, thereby becoming a web 580 of tackifier-containing, bloomed, unstretched thin polymer film by the time it reaches the winder 518, where it is wound into a roll. Where the heated roller 570 has a pattern engraved thereon, the thin polymer film so produced will have a pattern embodied therein, with the pattern resulting from differential, heat-induced shrinkage of respective portions of the thin polymer film, and tackifier bloom may be present only on certain portions of the thin polymer film.

Figure 6:
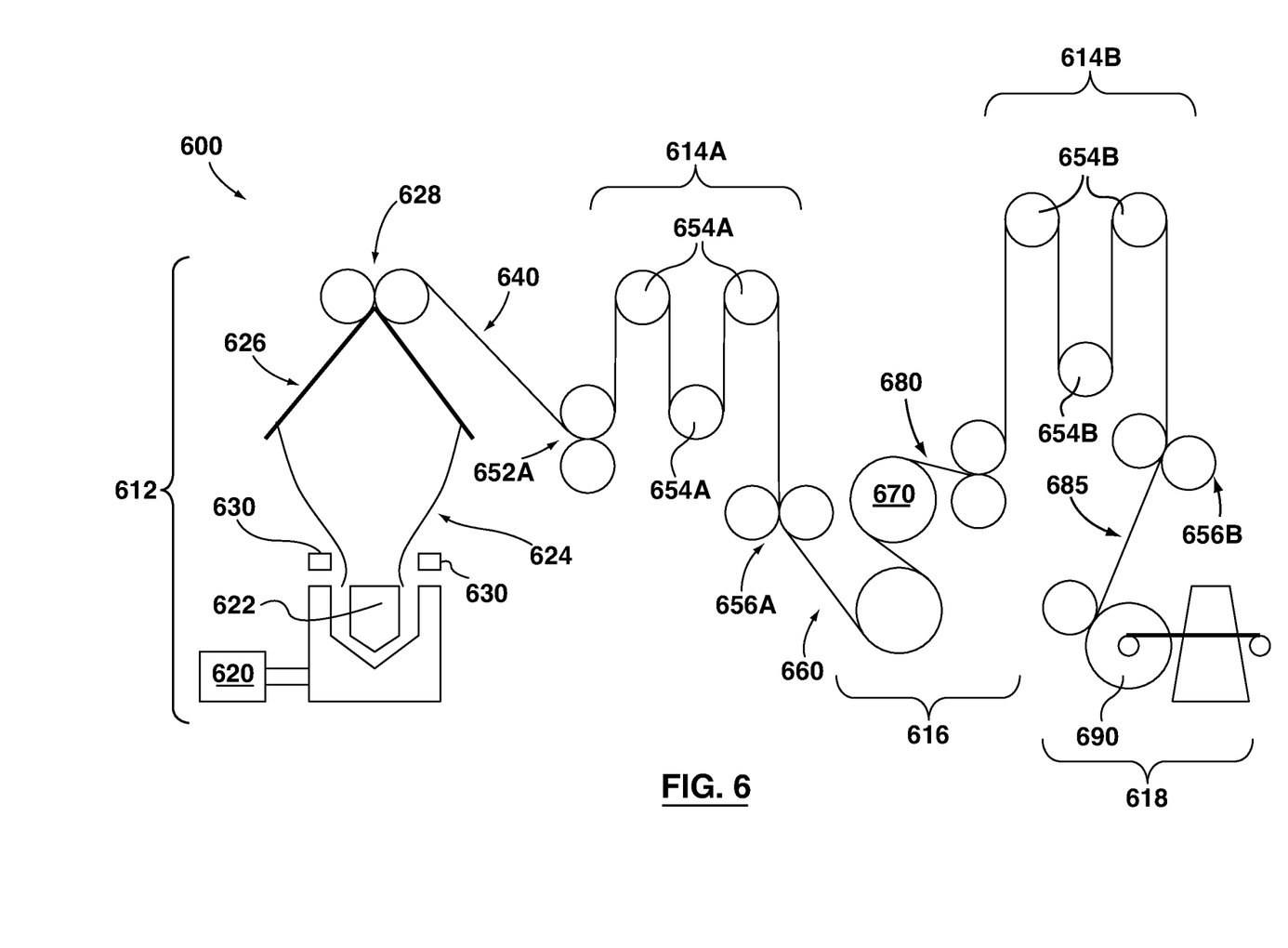
FIG. 6 is a schematic representation of a fifth apparatus for treating thin polymer film, in accordance with an aspect of the present invention.

In some instances, it may be advantageous to stretch a thin polymer film both before and after inducing tackifier bloom by heating. With reference now to FIG. 6, an apparatus including a film production unit 612, a first stretching mechanism 614A, a heater 616, a second stretching mechanism 614B, and a winder 618 is shown generally at 600. The apparatus 600 shown in FIG. 6 is generally identical to the apparatus shown in FIG. 1, except that in addition to the first stretching mechanism 614A which is upstream of the heater 616 and analogous to the stretching mechanism 114 in FIG. 1, the apparatus 600 also includes a second stretching mechanism 614B located downstream from the heater 616. Thus, a web 640 of tackifier-containing, unbloomed, unstretched thin polymer film emerges from the film production unit 612 to be stretched by the first stretching mechanism 614A so as to become a web 660 of tackifier-containing, unbloomed, stretched thin polymer film, is heated by proceeding through the heater 616 to become a web 680 of tackifier-containing, bloomed, stretched thin polymer film and is then further stretched by proceeding through the second stretching mechanism 614B to emerge as a web 685 of tackifier-containing, bloomed, further-stretched thin polymer film, which is then wound by winder 618 into a roll 690. The heater 616 is shown as comprising a heated roller 670; the heated roller 670 may optionally have a pattern engraved thereon for applying a pattern to a thin polymer film. Aside from the above-noted differences, analogous reference numerals, beginning with "6" instead of "1" are generally used to denote parts of the apparatus 600 that correspond to similar parts of the apparatus 100 shown in FIG. 1. Accordingly, the film production apparatus 612 in FIG. 6 corresponds to the film production apparatus 112 in FIG. 1, the heater 616 in FIG. 6 corresponds to the heater 116 in FIG. 1, and so on. The components of the first stretching mechanism 614A are denoted by the suffix "A" and the components of the second stretching mechanism 614B are denoted by the suffix "B".

Thus, a thin polymer film having tackifier-induced cling properties is produced by first producing a web 640 of tackifier-containing, unstretched, unbloomed thin polymer film, stretching the web 640 by passing the web 640 through a first stretching mechanism 614A to produce a web 660 of tackifier-containing, unbloomed, stretched thin polymer film, heating the web 660 by passing the web 660 through a heater 616 (in this case heated roller 670) so that the web 660 is heated to a temperature sufficient to cause tackifier bloom prior to the web reaching the next stage of the in-line process, thereby becoming a web 680 of tackifier-containing, bloomed, stretched thin polymer film. The web 680 of tackifier-containing, bloomed, stretched thin polymer film then proceeds to the next stage of the process, in this case a second stretching mechanism 614B, which further stretches the web so that it becomes a web 685 of tackifier-containing, bloomed, further-stretched thin polymer film, which then proceeds to the winder 618, where it is wound into a roll 690. Where the heated roller 670 has a pattern engraved thereon, the thin polymer film so produced will have a pattern embodied therein, with the pattern resulting from differential, heat-induced shrinkage of respective portions of the thin polymer film, and tackifier bloom may be present only on certain portions of the thin polymer film.

While the examples depicted above in FIGS. 1, 3, 4, 5 and 6 have shown only a single heater, one skilled in the art, once informed by the disclosure herein, will appreciate that multiple heaters may be used at multiple stages in an in-line process. For example, a thin polymer film could be heated to induce tackifier bloom, stretched (which would reduce the cling properties of the film), and then heated again to induce further tackifier bloom. Other similar variations are also within the contemplation of the inventor.

In the exemplary embodiments described above and illustrated in FIGS. 1, 3, 4, 5 and 6, the initial web of unbloomed, unstretched thin polymer film is described and illustrated as being produced by a blown film process. One skilled in the art, once informed by the disclosure herein contained, will appreciate that, with suitable adaptation, cast film techniques may also be used without departing from the scope of the present invention.

It will be appreciated that an apparatus according to the present invention need not include a film production unit, and may or may not include a stretching mechanism. For example, unbloomed thin polymer film could be produced and rolled (with or without pre-stretching) at a first location, and transported to a second location. At the second location, the unbloomed thin polymer film could be introduced to an apparatus adapted to receive a web of unbloomed thin polymer film and comprising a heater and a winder, so that a web of unbloomed thin polymer film is received by the apparatus, heated sufficiently to induce tackifier bloom by being passed through the heater so that it becomes a web of bloomed thin polymer film, and then passed to the winder to be wound into a roll. Optionally, such an apparatus may include a stretching mechanism upstream of the heater, downstream of the heater, or both upstream and downstream of the heater, so that one or more stretching steps may be carried out, with tackifier bloom being induced prior to the web reaching the next stage of the in-line process.

Thus, a thin polymer film having tackifier-induced cling properties may be produced by receiving a web of tackifier-containing, unbloomed thin polymer film, heating the web by passing the web through a heater so that the web is heated to a temperature sufficient to cause tackifier bloom prior to the next stage in the in-line process (which may be a stretching mechanism or a winder), thereby becoming a web of tackifier-containing, bloomed thin polymer film by the time it reaches the next stage.

Figure 7:
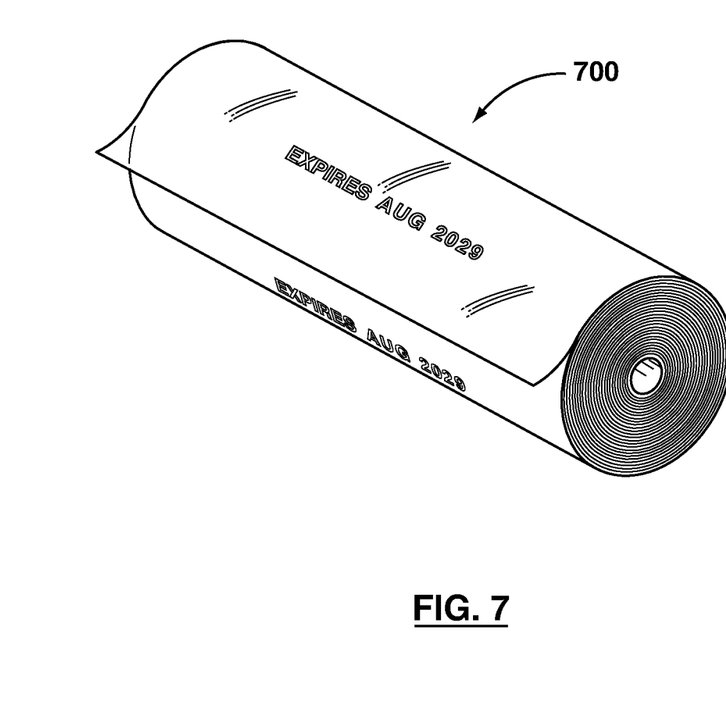
FIG. 7 is a perspective view of a roll of thin polymer film produced in accordance with an aspect of the present invention.

The thin polymer film in respect of which aspects of the present invention may be applied may be, without limitation, a monolayer film, a co-extruded multilayer film, a multilayer film comprising a plurality of individual film layers, or an extrusion coating laminate. An exemplary roll of thin polymer film produced according to an aspect of the present invention is shown in FIG. 7, and is indicated generally by the reference numeral 700.

Typically, the thin polymer film will be sufficiently thin, and will be moving at sufficient speeds, that no additional cooling is required after the film has passed through the heater, such as heated roller 170, 222, 370, 570 and 670, or oven assembly 470. Optionally, however, a cooling station may be positioned downstream of the heater.

Because the above-described methods and apparatus avoid the need to age tackifier-containing thin polymer film prior to using it or stretching it, it becomes possible to produce a roll of finished stretch film having tackifier-induced cling properties in a single, in-line operation. This may be done either by producing the thin polymer film and then heating it, or by heating a thin polymer film produced on a different apparatus. In particular, because the blooming induced by the heating causes the thin polymer film to relatively immediately become tacky, the film can be wound in gap mode, thereby facilitating the formation of soft rolls. Thus, the aging process, that is, storage in a temperature controlled warehouse, may be eliminated. In addition, patterns may be applied to the thin polymer film.

Suitable polymers for producing the thin polymer films include polyolefins, such as polyethylene and its copolymers, as well as plasticized polyvinyl chloride (PVC). Suitable bio-polymers, such as polylactic acid (PLA) may also be used, as can suitable thermoplastic resins. Suitable film thicknesses are from about 0.2 microns to about 50 microns. Suitable tackifiers include low molecular weight polyolefins, such as polyisopropylene, and large molecular monomer organic compounds as glycol and phthalates.

One or more currently preferred embodiments have been described by way of example. It will be apparent to persons skilled in the art that a number of variations and modifications can be made without departing from the scope of the invention.

What is claimed is:

1. A method for treating stretch film and applying a pattern thereto, the method comprising:
    passing a web of oriented thin polymer film across at least one heated roller;
    the at least one heated roller being hotter than the web;
    the at least one heated roller having the pattern engraved on a surface thereof so as to define face regions and relief regions on the surface, with the face regions and relief regions collectively conforming to the pattern;
    so that as the web contacts the surface of the at least one roller, portions of the web positioned over the relief regions receive relatively less heat from the at least one roller than portions of the web positioned over the face regions of the at least one roller;
    thereby causing the respective portions of the web to undergo differential, heat induced shrinkage whereby the differential heat-induced shrinkage imparts the pattern to the thin polymer film.

2. The method of claim 1, wherein:
    the web contains tackifier;
    the web is unbloomed when passed across a first one of the at least one heated roller; and
    the portions of the web positioned over the face regions of the at least one heated roller are heated by the at least one heated roller to a temperature sufficient to cause tackifier bloom prior to the web reaching a winder.

3. The method of claim 1, wherein the pattern is formed by changeable type on the roller.

4. The method of claim 3, wherein the changeable type is arranged into an expiry date for a product which is to be wrapped by the web of thin polymer film.

5. The method of claim 1, wherein the web is passed across the at least one heated roller before stretching of the web.

6. The method of claim 1, wherein the web is passed across the at least one heated roller after stretching of the web.

7. The method of claim 1, wherein the web is passed across the at least one heated roller in an unstretched state and is passed to the winder in an unstretched state.

* * * * *